Oct. 12, 1948.  W. R. KOCH  2,451,291
SUPERREGENERATIVE RECEIVER
Filed Sept. 8, 1943  2 Sheets-Sheet 2
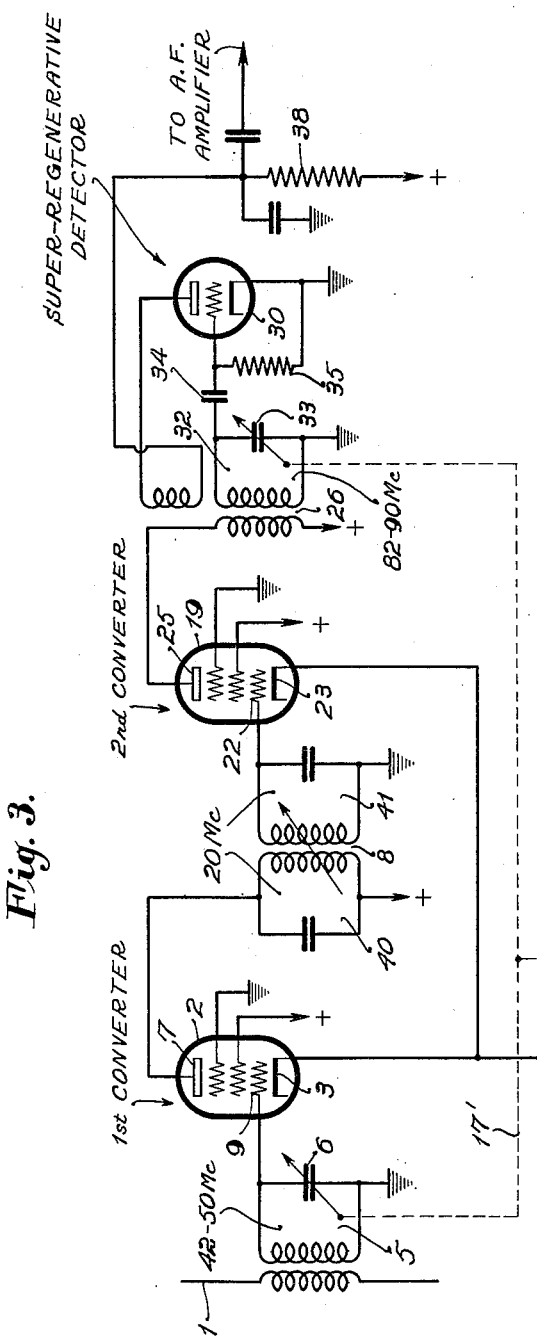
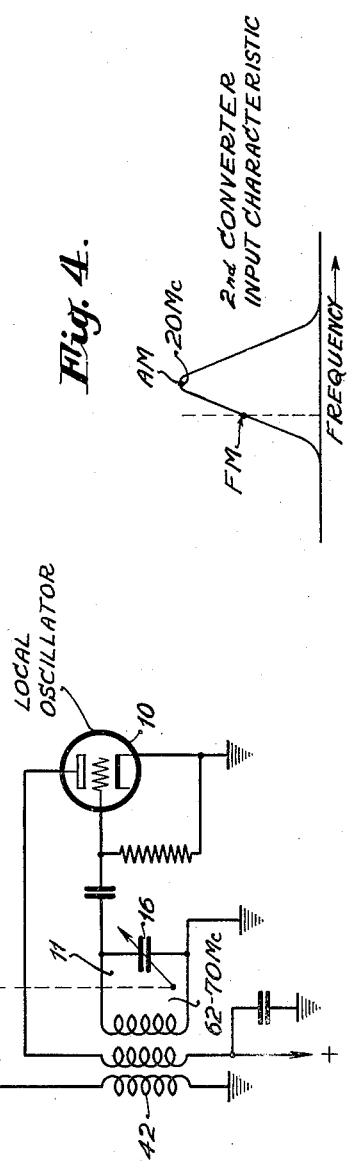
INVENTOR.
Winfield R. Koch
BY
H. S. Grover
ATTORNEY Patented Oct. 12, 1948

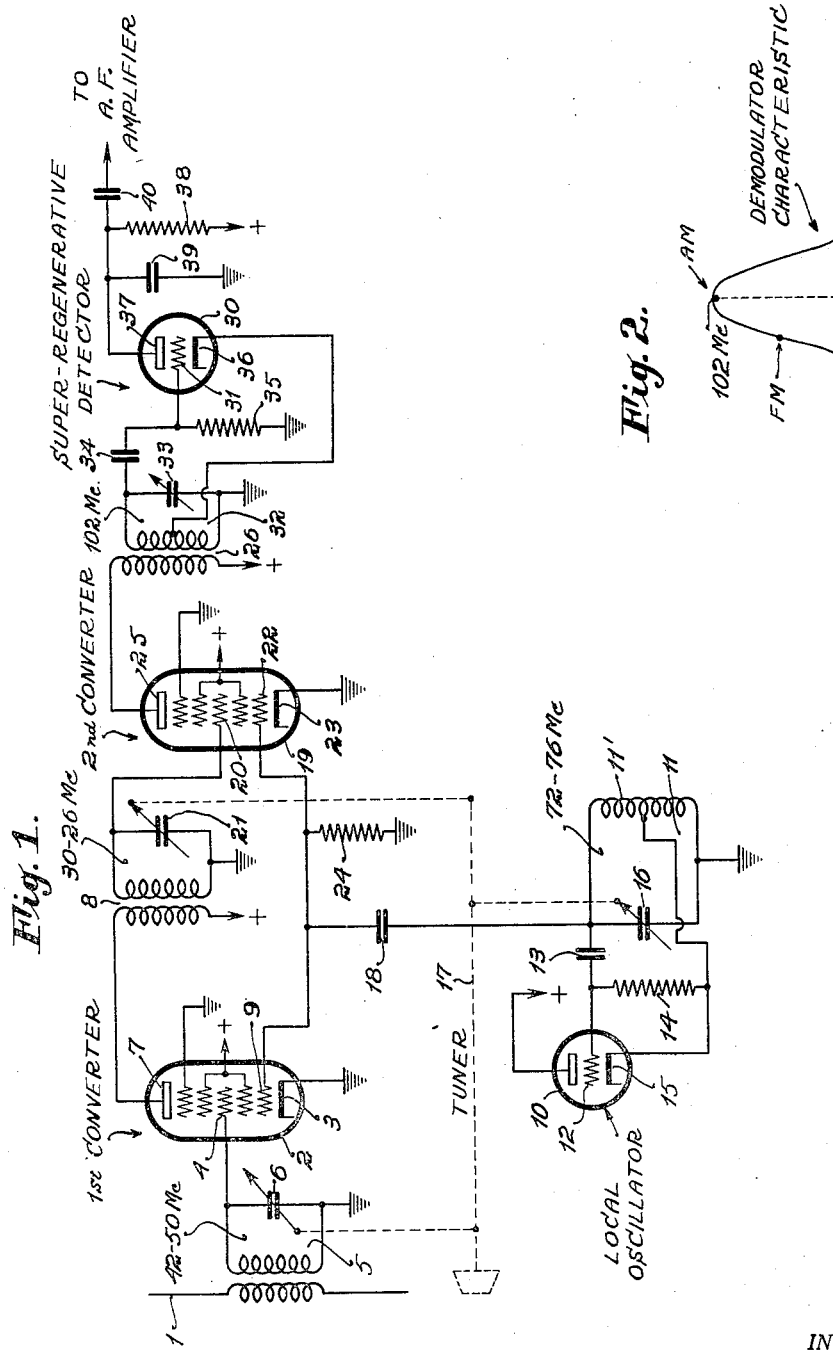

2,451,291

UNITED STATES PATENT OFFICE 2,451,291

SUPERREGENERATIVE RECEIVER

Winfield R. Koch, Haddonfield, N. J., assignor to Radio Corporation of America, a corporation of Delaware Application September 8, 1943, Serial No. 501,538

5 Claims. (Cl. 250—20)

My present invention relates generally to radio receiving systems of the super-regenerative type, and more particularly to a super-regenerative receiver of improved signal-receiving characteristics.

It has been considered difficult in the past to design a super-regenerative receiver having a relatively high degree of selectivity prior to the point of super-regeneration. One of the most important problems which has been encountered in providing a high degree of selectivity in a super-regenerative receiver is the fact that the signal selector circuits prior to the point of super-regeneration are shock-excited by the quench frequency currents, or by the large radio frequency currents existing in the regenerated circuit. Stated another way, prior super-regenerative receivers employing signal selector circuits, tuned to the super-regenerated frequency, would have voltage fed into them from the super-regenerated circuit. Such voltage would be stronger than the signal, and, therefore, would mask it. Lack of radio frequency amplification and selectivity ahead of the point of super-regeneration gave such receivers a poor signal-to-noise ratio.

It may, therefore, be stated to be one of the main objects of my invention to provide a super-regenerative receiver which has a highly improved signal-to-noise ratio; a relatively improved degree of selectivity existing ahead of the point of super-regeneration.

It has, also, been known in the past to provide a superheterodyne receiver with a super-regenerative detector functioning as the second detector network. Such receivers do not provide the high signal-to-noise ratio and high degree of selectivity which my invention seeks to attain.

It may be stated that it is a further object of this invention to provide a double heterodyne receiving system wherein a common local oscillator is employed for two sequential heterodynes prior to the point of super-regeneration, thereby securing improved performance.

Another object of this invention is to provide a super-regenerative receiver wherein a plurality of cascaded signal selector circuits are employed prior to the point of super-regeneration thereby giving additional selectivity and signal amplification.

A further object of the invention is to provide a novel method of receiving radio frequency signals by super-regeneration, wherein the super-regeneration occurs at a frequency far removed from the frequency of preceding signal selector circuits thereby preventing feedback excitation and radiation.

A more specific object of my invention is to provide a super-regenerative receiver of the double heterodyne type; a common local oscillator being employed to provide the local oscillations for a pair of successive converters; the receiver having a relatively high degree of selectivity and sensitivity when receiving frequency modulated carrier waves; and a relatively simple adjustment being sufficient to render the system operative to receive either amplitude modulated or frequency modulated carrier waves.

Still other objects of my invention are to improve generally the efficiency of operation, selectivity and sensitivity of super-regenerative receivers, and more especially to provide a double heterodyne type of super-regenerative receiver which is not only economical to manufacture and assemble, but offers highly improved performance over prior super-regenerative receivers.

The present invention will best be understood by reference to the following description, taken in connection with the drawing, in which I have indicated diagrammatically several circuit organizations whereby my invention may be carried into effect.

In the drawing:

Fig. 1 shows an embodiment of the invention,

Fig. 2 shows an idealized resonance curve characteristic of the super-regenerative detector input circuit of the system in Fig. 1, Fig. 3 shows a modified form of the invention, Fig. 4 shows an idealized resonance curve characteristic at the second converter input of the system of Fig. 3.

Referring now to the accompanying drawing, wherein like reference characters in the different figures designate similar circuit elements, the system shown in Fig. 1 is generally a double heterodyne type of superheterodyne receiver which utilizes a detector or demodulator of the super-regenerative type. Locally-produced oscillations are provided for sequential or cascaded converters by a common local oscillator network. By way of illustration, let it be assumed that the receiving system is adapted to operate in the 42 to 50 megacycle (mc.) range. This is the present frequency modulation (FM) band. In this band the various station channels are substantially 200 kilocycles (kc.) wide, although at each FM transmitter the mean or carrier frequency is deviated up to a maximum of 75 kc. on each side of the mean frequency. In FM transmission, as those skilled in the art of FM communication fully know, the mean station frequency is deviated or swung to a degree determined by the amplitude of the modulation signals while the modulation frequencies determine the number of times per second that the change or deviation in frequency of the station carrier takes place. The generic term "angle modulated carrier wave" in this application is to be understood as including either frequency modulation or phase modulation or hybrid modulation having characteristics of either of the latter forms of modulation.

It is to be clearly understood that my invention is not restricted to the reception of angle modulated carrier waves, since it is well adapted for the reception of amplitude modulated (AM) carrier waves. Many of the ultra-high frequency bands are assigned to communication employing amplitude modulation of the carrier waves. The numeral 1 designates the receiver signal collecting device which is represented as a dipole, although it may be the usual grounded antenna circuit or a high frequency transmission line.

The first converter stage of the receiver comprises an electron discharge tube 2 which is shown as being of the pentagrid type. The cathode 3 of the converter tube is represented as established at ground potential, while the signal input grid 4, which is the third grid from the cathode, is connected to the high alternating potential side of the tunable input circuit 5. The latter consists of a parallel resonant circuit including the variable tuning condenser 6. It is to be understood that the tunable input circuit 5 in the case of AM carrier wave reception will have a pass band width sufficient to pass the modulation side bands of the AM waves. In the case of FM reception the pass band width of the tunable circuit 5 would be such as to pass the maximum overall deviation of 150 kc., so that all modulation components of the carrier wave may be efficiently transmitted to the succeeding stages.

The plate 7 of tube 2 is connected to a source of positive energizing potential through the primary winding of the coupling transformer 8. The numeral 9 denotes the oscillation input grid of the converter tube 2. This oscillation grid is the first grid adjacent the cathode. The remaining grids of tube 2 may be established at positive potentials in order to function as screening grids, except the suppressor which is connected to the cathode or ground. It will be understood that the signal collector device 1 is coupled to the tunable input circuit 5 so as to impress on the tunable input circuit 5 the collected signal energy, whether it be FM or AM carrier waves.

The local oscillator is shown as comprising a tube 10 of the triode type. Of course, the invention is not restricted to the use of a triode tube. Any other well-known and conventional form of local oscillator can be used. The oscillator consists of a tunable tank circuit 11 whose high alternating potential side is connected to the control grid 12 of the oscillator tube through a direct current blocking condenser 13, the grid 12 being connected by the leak resistor 14 to the cathode 15. The cathode is connected to an intermediate tap on the tank coil 11', and the low potential side of the tank circuit is established at ground potential. The plate of the oscillator tube is connected to a positive potential source.

The numeral 16 designates the variable oscillator tuning condenser which is adapted to tune the parallel resonant circuit 16—11' over a predetermined oscillator range of 72 to 76 mc. The rotors, or adjustable elements, of the tuning devices 6 and 16 are mechanically coupled so as to provide uni-control tuning means. The dotted line 17 indicates the manually adjustable tuner mechanism of the receiver. The condenser 18 couples the oscillation input grid 9 to the high alternating potential side of tank circuit 11. In this way the locally produced oscillations of predetermined frequency are injected into the first converter stage. Those skilled in the art are fully aware of the manner in which the first converter tube operates. Briefly stated, electron coupling is relied upon to cause the production of currents of the heterodyne frequency in the plate circuit of the converter tube.

The second converter tube is designated by the numeral 19. This tube may be of the same type as the first converter tube 2. The signal input grid 20 of tube 19 is connected to the high alternating potential side of its tunable input circuit. The latter comprises the secondary winding of coupling transformer 8 and the shunt tuning condenser 21. The low potential side of the second converter input circuit is established at ground potential, as in the case of the first tunable input circuit 5. The tuning device 21 has its adjustable element mechanically coupled to the tuning device 17. The tuning range of the device 21 is such as to tune the input circuit of converter tube 19 over a predetermined range of 30 to 26 mc. It will be recognized that this range is the range of I. F. values produced in the plate circuit of the first converter tube.

In other words, at each setting of the tuning device 17 there will be produced an I. F. current whose frequency value is the difference between the selected frequencies of the signal input circuit 5 and the oscillator tank circuit 11. The variable tuning devices 6, 16 and 21 will be so constructed and relatively arranged as to provide proper "tracking" between the three respective tunable circuits. It is pointed out that instead of using variable tuning condensers there may be employed permeability tuners of any well known form, or brass plug tuners of the reciprocating type. In each of these cases proper tracking between the three tunable circuits may readily be maintained. Where the tuning devices 6, 21 and 16 are variable condensers, their respective rotors may be so relatively shaped as to provide proper tracking.

The converter tube 19 has the locally-produced oscillations applied to its oscillation input grid 22. Grid 22 is the first grid adjacent the grounded cathode 23 of tube 19. Grid 22 is returned to ground through the resistor 24. It will, therefore, be seen that the locally-produced oscillations covering a frequency range of 72 to 76 mc. are injected into the successive converters by the common condenser 18. The remaining electrodes of tube 19 may be established at a common positive potential to provide proper screening, except the suppressor which is grounded. The plate 25 of tube 19 is connected to a source of proper positive potential through the primary winding of the coupling transformer 26.

There will be produced beat frequency currents in the plate circuit of tube 19 by virtue of electron coupling between the energized grids 20 and 22. It will be noted that I have chosen the local oscillation range of 72 to 76 mc. so that for each respective first I. F. value in the range of 30 to 26 mc. there will be produced the same beat frequency value of 102 mc. In other words, at each setting of the tuner device 17 there will be produced a constant beat frequency value of 102 mc.

This value represents the sum heterodyne or beat frequency of each respective first I. F. value and its corresponding local oscillator frequency. It is desirable to have the input circuit of the converter tube 19 of a pass band width corresponding (for AM and FM reception) to that of the input circuit 5.

The sum beat frequency energy of 102 mc. is developed across the resonant input circuit of the detector or demodulator of the receiver. The detector tube is designated by the numeral 30, and is shown as being of the triode type. Of course, the invention is not limited to this type of tube. The signal input grid 31 of tube 30 is connected to the high alternating potential side of the resonant input circuit 32. The circuit 32 consists of the secondary winding of coupling transformer 26 and the parallel shunt resonating condenser 33. The grid 31 is connected to the high alternating potential side of the input circuit 32 by the condenser 34, the resistor 35 connecting the grid 31 to ground. The cathode 36 of the detector tube is connected to an intermediate tap on the secondary winding of transformer 26, while the low potential side of the input circuit 32 is grounded. The plate 37 of the detector tube is connected to a source of positive potential through an output load resistor 38, the high frequency bypass condenser 39 being connected from plate 37 to ground. The audio, or modulation, signal voltage developed across resistor 38 is transmitted through the coupling condenser 40 to the succeeding audio frequency amplifier. The latter may comprise one or more stages, and may terminate in a reproducer of the loudspeaker type.

Super-regenerative action is provided at the detector circuit by choosing the constants of condenser 34 and resistor 35 so as to quench the 102 mc. oscillatory energy at a predetermined quench frequency. The quench frequency in general is superaudible, and a frequency of the order of 25 kc. is a preferred value of quench frequency. Those skilled in the radio communication art are very well acquainted with the manner of producing super-regeneration, and, therefore, only a brief reference will be made herein to the theoretical aspects of the action. By virtue of the cathode tap on the secondary winding of transformer 26, regenerative feedback at 102 mc. is provided. This regeneration builds up to the point of incipient self-oscillation. Damping of the oscillations at the quench frequency occurs with the result that a high amplification is built up at the detector input circuit. Since the damping occurs at a superaudible rate the reproducer does not produce audio effects corresponding to the rapid breakdown of the super-regenerated signals. It is to be understood that the input circuit 32 will be given a resonance curve characteristic such that in the case of AM reception the modulation side bands will readily pass, while for FM reception the side of the resonance curve must have a reasonably straight portion over a region including the maximum frequency swing of the signal energy.

Assume, now, that the signal energy received at the collector 1 is an AM carrier wave. By way of illustration, let it also be assumed it has a carrier frequency of 42 mc. The tuning device 16 will be adjusted to provide oscillations of 72 mc. The tuning device 6 is adjusted to receive the 42 mc. carrier. Simultaneously, the tuning device 21 will be adjusted so as to tune the input circuit of converter tube 19 to a frequency of 30 mc. This will all be accomplished by the common tuner 17. As a result, there will be produced beat frequency energy at the input circuit 32 whose carrier frequency is 102 mc. Referring to Fig. 2, there is shown the resonance curve characteristic of the input circuit 32. For AM reception it is indicated that the tuning means 33 will be adjusted, and this is a narrow-range adjustment device, so that circuit 32 will be tuned to the peak of the resonance curve. The detection will be of the familiar super-regenerative type which gives a high degree of sensitivity to the receiver. The resulting audio frequency voltage enevelope produced in the process of detection will be derived from across the output load resistor 38, and subsequent audio frequency voltage amplification will be had prior to ultimate reproduction of the audio frequency signals.

In the case of FM reception it is only necessary to adjust the device 33 so as to shift the frequency of circuit 32 to a point on either slope of the resonance curve shown in Fig. 2. The letters "FM" indicate the intermediate point on the slope of the curve providing FM detection. It will be recognized that the circuit 32 will have the familiar mistuning of a simple FM discriminator network. In that case the FM energy at the circuit 32 will be converted or translated into corresponding accompanying AM energy whose mean frequency is the mean frequency of the received FM wave energy heterodyned to the sum beat frequency value. Super-regenerative detection is then utilized to rectify the resulting AM wave energy with the resulting high degree of sensitivity.

In order properly to present the advantages of the present invention, it is first pointed out that the quench frequency is very far removed from the frequency of the super-regenerated signal energy. This of itself is of great advantage in the case of a super-regenerative receiver. Furthermore, super-regeneration occurs at the ultrahigh frequency of 102 mc. It has been found that the super-regenerative effects are highly emphasized in the ultra-high frequency range. One reason may be that the frequency of the super-regenerative tuned circuit is much further removed from the quench frequency, so that the harmonics of the quench frequency, formed in the grid circuit of the tube 30, will have to be of much higher order to occur at the frequency of the tuned circuit. This would mean that voltages induced in this circuit by the quench frequency would be smaller for ultra-high frequencies, and would not overshadow weak signals. Another important advantage which is secured by this system resides in the fact that cascaded selectivity is provided prior to the point of super-regeneration. In addition to thi cascaded selectivity, it will be noted that the first intermediate frequency employed is of a relatively low value with respect to the higher sum beat frequency value.

In view of the fact that the prior selector circuits 5 and 8, 21 are operating at different frequencies, and are of much lower frequency than the detector input circuit 32, there is relative freedom from shock excitation of these earlier selector circuits. Such excitation may be caused by harmonics of the quench frequency currents, but is usually caused by the relatively large oscillations which are built up at the point of super-regeneration. The earlier tuned circuits which are thus excited during the portion of the quench cycle when the voltage in the super-regenerated circuit is large have this voltage persist over the remainder of the quench cycle thereby masking the desired signal. The regenerated circuit voltage may be 10 volts, and the signal only 10 microvolts, or as much as a million times greater. Summing up, then, it will be noted that the two selector circuits preceding the super-regenerated circuit 32 give additional selectivity and signal amplification. The super-regeneration occurs at a frequency far removed from that of the preceding selector circuits thus avoiding any feedback or shock excitation. There is no chance for radiation to spoil reception by other receivers. The additional selectivity, furthermore, gives greater sensitivity when receiving FM signals by slight mistuning of the detector input circuit. Satisfactory super-regeneration is assured at the detector input circuit, because this particular circuit does not have to be variably tuned and is operated at the fixed 102 mc. value.

The modification shown in Fig. 3 essentially differs from the arrangement shown in Fig. 1 in that the first I. F. value is substantially constant over the range of adjustment of the tuner device 17'. The first converter tube 2 has its grid 9 in this case functioning as the signal input grid. The latter is connected to the high alternating potential side of the tunable input circuit 5. The plate 7 has arranged in circuit therewith the resonant primary circuit 40 which is fixedly tuned to the first I. F. value of 20 mc. The second converter tube 19 has its first grid 22, functioning as the signal input grid, connected to the high potential side of fixedly tuned secondary circuit 41. The latter is the resonant secondary circuit of coupling transformer 8. The cathodes 3 and 23 of tubes 2 and 19 respectively are connected in common to ground through a coil 42. The oscillations produced by the local oscillator tube 10 are induced in the cathode coil 42. The local oscillator in this modification is shown as of the type wherein the plate is regeneratively coupled to the tunable tank circuit 11.

It is to be clearly understood that the tank circuit 11 is variably tuned over the oscillator frequency range by the tuning device 16. The oscillator tuning range in this case is 62 to 70 mc. In the present case, the tuning devices 6 and 16 will be adjusted so that there is provided a substantially constant I. F. value in the network 40—41. The screen grids of each of the tubes 2 and 19 are supplied with suitable positive voltages, and the suppressors are connected to ground. The plate 25 of the second converter tube 19 is connected to a source of positive direct current potential through the primary winding of the coupling transformer 26. The tunable input circuit 32 of the detector tube 30 is tuned by the tuning device 33 over a tuning range of 82 to 90 mc. Accordingly, it will be seen that the second heterodyne energy is variable in frequency, and its frequency is equal to the sum of a selected locally-produced oscillation frequency and the constant I. F. value.

The tuning device 33 has its adjustable element mechanically coupled to the tuning devices 6 and 16. It will be understood, of course, that the oscillator tank circuit 11 will be constructed so as to "track" with the signal input circuit 5 thereby to provide a substantially constant first I. F. value throughout the tuning range. As in the case of the system of Fig. 1 the received signal energy is heterodyned with the locally-produced oscillations to provide the difference frequency, but in this case the difference frequency has a constant value throughout the tuning range. The locally-produced oscillations are then employed to provide a sum heterodyne frequency with the first I. F., but in this case a variable-frequency sum heterodyne is provided.

Super-regeneration is provided in the system of Fig. 3 by properly choosing the constants of condenser 34 and resistor 35. In place of connecting the cathode to an intermediate point on the input coil of the detector input circuit, there is provided the equivalent plate feedback arrangement for regeneration. The advantages explained in connection with the system of Fig. 1 are equally applicable to this modification. By maintaining the first I. F. value at a fixed magniture there is secured a much greater selectivity in an economical manner, because any desired number of fixedly tuned circuits can be interpolated between tubes 2 and 19. For AM reception, reference being made to the resonance curve characteristic shown in Fig. 4, the circuits 40 and 41 are tuned to the peak of the resonance curve.

The resonance curve shown in Fig. 4 is that of the input network of the second converter tube 19. Of course, for AM reception the resonance curve can be given a band pass shape. For FM reception, on the other hand, the resonance curve can be adjusted so as to have long, straight, sloping sides somewhat along the line of the purely illustrative curve of Fig. 4. The circuits 40 and 41 may then each be tuned to the center of one of the sloping sides of the curve thereby providing the mistuned discrimination network which is necessary to convert the FM energy into corresponding concomitant AM wave energy. The resulting wave energy having amplitude modulation, as well as frequency modulation, would then be detected in the usual manner by the super-regenerative detector circuit.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In combination with a pair of cascaded converters, a common source of locally-produced oscillations, means for supplying to the first of said converters signals of a predetermined high frequency, means for applying oscillations from said common source to both said converters for mixing with signals, said common source being tuned to a frequency which is different from the signal frequency by a predetermined frequency value, said second converter having an input circuit tuned to a frequency equal to the difference between said signal frequency and oscillation frequency, a super-regenerative detector having an input circuit coupled to the output of said second converter, the detector input circuit being tuned to a frequency equal to the sum of the frequency of said locally-produced oscillations and said difference frequency.

2. In combination with a super-regenerative detector circuit of the self-quenching type, said detector having an input circuit, means for improving the selectivity of signal transmission to the detector input circuit, said means comprising at least two cascaded converter stages, each of said converter stages having a respective input circuit, means for tuning the first converter input circuit over a wide range of signal frequencies, means for tuning the second converter input circuit over a different range of frequencies, a single oscillator commonly connected to each of said converter stages, said oscillator including means tuning it over a range of oscillation frequencies such that the heterodyne frequency of the first converter is equal to the difference between a signal frequency at the first converter input and a selected local oscillation frequency while the tuning range of the second input circuit is so related to the oscillator tuning range as to produce a sum frequency equal to the detector input circuit frequency and means feeding the output of the said second converter to a super-regenerative detector.

3. In combination with a super-regenerative detector circuit of the self-quenching type, at least two cascaded converter stages, each of said converter stages having a respective input circuit, means for tuning the first converter input circuit over a wide range of signal frequencies, means for tuning the second converter input circuit over a different range of frequencies, a single oscillator connected in common to both converters, means for tuning the oscillator over a range of oscillation frequencies, a common control for said three tuning means and means feeding the output of the said second converter to a super-regenerative detector.

4. In combination a source of angle modulated carrier waves, a pair of cascaded converters, a common source of locally-produced oscillations, means for supplying to the first of said converters said waves of a predetermined mean frequency, means for applying oscillations from said common source to said first converter, said common source being tuned to a frequency which is different from the signal frequency by a predetermined frequency value, a second converter having an input circuit tuned to a frequency equal to the difference between said signal frequency and oscillation frequency, means supplying oscillations from said common source to said second converter, a super-regenerative detector having an input circuit coupled to said second converter, the detector input circuit being tuned to a frequency higher than said mean frequency and equal to the sum of said locally-produced oscillation frequency and said difference frequency.

5. In a radio receiver, a first signal selector circuit including means for tuning it over a desired range of high frequency signals, a source of local oscillations including means for tuning it over a range of oscillation frequencies differing from said signal frequency range by a predetermined intermediate frequency, a first converter connected to said source and selector circuit to provide a signal of said intermediate frequency in its output circuit, a second converter having input and output circuits, means connecting the second converter input circuit to said oscillation source and the first converter output circuit to provide a heterodyne signal of a frequency value equal to the sum of said intermediate frequency and a selected local oscillation frequency, a super-regenerative detector having an input circuit coupled to the second converter output circuit, and said detector input circuit including means for tuning it over a range of said sum heterodyne frequencies.

WINFIELD R. KOCH.

REFERENCES CITED

The following references are of record in the file of this patent:

UNITED STATES PATENTS

| Number | Name | Date |
|---|---|---|
| 2,148,287 | Becker | Feb. 21, 1939 |
| 2,282,092 | Roberts | May 5, 1942 |

OTHER REFERENCES

"QST" for November 1935, pp. 10–14, copy in Scientific Library and print of said pages in Division 51, Class 250–20–39.